United States Patent
Smith et al.

(10) Patent No.: US 6,649,200 B2
(45) Date of Patent: Nov. 18, 2003

(54) CHEESE RIPENING PROCESS

(75) Inventors: Mark R. Smith, London (GB); Paul D. Browning, Orpington (GB); Denise Pawlett, London (GB)

(73) Assignee: Imperial Biotechnology Limited, London (GB)

( * ) Notice: Subject to any disclaimer, the term of this patent is extended or adjusted under 35 U.S.C. 154(b) by 0 days.

(21) Appl. No.: 09/749,910

(22) Filed: Dec. 29, 2000

(65) Prior Publication Data

US 2001/0024667 A1 Sep. 27, 2001

Related U.S. Application Data

(63) Continuation of application No. PCT/GB99/02036, filed on Jun. 29, 1999.

(30) Foreign Application Priority Data

Jun. 29, 1998 (GB) .............................................. 9814056

(51) Int. Cl.$^7$ ................................................. A23C 9/12
(52) U.S. Cl. ........................... 426/42; 426/34; 426/36; 426/38; 426/43; 426/582
(58) Field of Search .............................. 426/34, 36, 38, 426/39, 40, 42, 43, 654, 580, 582

(56) References Cited

FOREIGN PATENT DOCUMENTS

JP          07255467          9/1995

OTHER PUBLICATIONS

Kets et al. AN 94(07):A0031 FSTA, abstracting FEMS Microbiology Letters, 1994, 116 (3), 251–256.*
Law et al., AN 304639 Frosti, abstracting Dairy science: functional properties of milk proteins; water sorption by milk proteins; methods for activity of indigenous and bacterial proteinases; accelerated ripening of non–Cheddar cheese., Published by : IDF, Brussels, 1987, 45–52, IDF Bulletin, No. 209.*
Muir et al., AN 288731 Frosti, abstracting Milchwissenschaft, 1992, 47(4), 218–22.*
Planckh, B., AN 74(12):P1812 FSTA, abstracting Milchwirtschaftliche Berichte aus Den Bundesanstalten Wolfpassing und Rotholz, 1974, No. 38, 1–29.*

H. Choi et al.: "Production of aminopeptidase from skim milk whey permeate medium by *Lactobacillus casei*; ssp. *Casei*." Journal of Dairy Science, vol. 79, 1996, pp. 956–963, XP002119224 Champaign, Illinois US p. 956, col. 1 p. 961.
El Abboudi M et al.: "Peptidase Deficient Mutants—A New Tool for the Study of Cheese Ripening" Milchwissenschaft, vol. 47, No. 10, Jan. 1, 1992, pp. 625–628, XP000328598 ISSN: 0026–3788, p. 625.
G. Somkuti et al.: "Permeabilization of *Streptococcus thermophilus* and the expression of beta–galactosidase" Enzyme Microb. Technol., vol. 16, No. 7, 1994, pp. 573–576, XP002119225 p. 573, col. 57—p. 574.
Patent Abstracts of Japan vol. 1996, No. 02, Feb. 29, 1996 & JP 07 255467 A (Snow Brand Milk Prod. Co. Ltd.), Oct. 9, 1995 abstract.
Fox P. F.: "Acceleration of Cheese Ripening" Food Biotechnology, vol. 2, No. 2, Jan. 1, 1988, pp. 133–185, XP000671356 ISSN: 0890–5436 p. 146 –p. 150.
Aston et al., "Proteolysis and Flavour Development in Cheddar Cheese" Aust. Journal Dairy Technology, 38:55, 1983.
Fox et al., "Acceleration of cheese ripening" Antonie van Leeuwenhock, 70, 271–297, 1996.
Exterkate F. A., "Effect of membrane perturbing treatments on the membrane bound peptidases of *Streptococcus cremoris* HP" J. Dairy Res., 46, 473–484, 1979.
Scopes, R. K., Protein Purification, Principles and Practice, 1982, Springer advanced texts in Chemistry, publ. Springer–Verlag.
Terzaghi B.E. and Sandine W.E., 1975, "Improved Medium for Lactic Streptococci and Their Bacteriophages" Applied Microbiology 29, 807–813.
Frey et al. Milchwissenschaft, 41 [11], 1986.
Scott, R. "Cheesemaking Practice" Ch. 11, pp. 145–146, 1986 (Elsevier).

* cited by examiner

Primary Examiner—Leslie Wong
(74) Attorney, Agent, or Firm—Baker & Hostetler, LLP

(57) ABSTRACT

A method for cheese ripening using a primary starter culture and an attenuated starter culture, wherein the attenuated starter culture is treated with a surface active agent, such as SDS, which substantially kills all of the attenuated starter culture cells, but maintain their enzyme activity, and accelerate cheese ripening without compromising flavor.

18 Claims, No Drawings

CHEESE RIPENING PROCESS

RELATED APPLICATIONS

This application is a continuation of International Application No. PCT/GB99/02036, filed on Jun. 29, 1999, which in turn claims priority from Great Britain Patent Application No. 9814056.9, filed on Jun. 29, 1998, both of which are incorporated herein by reference.

The present invention relates to a process for the accelerated ripening of cheese.

Cheese ripening is the term used to describe the process whereby changes occur in the curd, resulting in the development of flavour, texture and aroma in the finished cheese. In commercial cheese production, ripening is initiated by the addition of a bacterial starter culture and rennet to milk. The starter culture bacteria convert lactose into lactic acid, producing an acidic environment in which biochemical reactions occur that are critical for cheese ripening. (Scott, R., 'Cheesemaking practice', Chapter 11, pages 145–146, 1986, Publ. Elsevier). Furthermore, enzymes released from the bacteria are also involved in the degradation of proteins into peptides and amino acids, and the breakdown of fatty acids into keto acids, ketones and esters by lipolysis. These breakdown products are important in the development of flavour, aroma and texture (Aston et al., Aust. Journal Dairy Technology, 38:55, 1983). In all, the ripening process can take up to a year or more.

Modern cheesemaking techniques employ a number of different methods in order to speed up the ripening process, so that the resulting cheese requires less storage time before maturation is complete and is available for sale more quickly.

One method for accelerating the rate of cheese maturation is to add purified bacterial proteolytic enzymes to the maturing cheese (Fox et al., Antonie van Leeuwenhock, 70, 271–297, 1996) but this involves expensive enzyme isolation. Moreover, the majority of the enzyme is commonly lost in the whey.

An alternative method for increasing the rate of ripening is to add a proportionally greater number of starter culture bacteria to the maturing cheese, in order to provide a larger pool of bacterial enzymes. However, if the number of bacteria added exceeds a certain threshold, the level of lactic acid that is produced by the bacterial starter culture imparts flavour and texture defects to the cheese. Thus, the maximum size of starter culture is effectively limited.

To increase the number of starter culture bacteria without increasing cheese acidity, modern cheesemaking methods have employed attenuated starter cultures, added at the same time as the primary culture. The primary culture is responsible for establishing the necessary acidity. However, in the attenuated starter culture, a majority of the cells is killed, or at least rendered incapable of growing in the cheese making process, such as by heat- or freeze-shocking, which prevents or suppresses acid production, but leaving proteolytic enzymes undamaged. Pre-treatment to kill a proportion of the cells, thereby preventing the metabolic processes that lead to acid production, is described by Frey et al. (Milchwissenschaft, 41 [11], 1986). The treatment may also lyse some cells, resulting in losses of enzymes to the whey.

One problem with methods that are based upon temperature shock is that bacterial cells and the enzymes they contain have different sensitivity to heat treatment. Some starter culture cells are stable to temperature shock, while the enzymes important in cheese ripening are temperature sensitive. In this case it is difficult to sufficiently attenuate the cell culture whilst still retaining the desired enzyme activity. The end result is only a very moderate increase in flavour intensity. The use of heat shocked cells additionally presents other problems, such as cheese bitterness, off-flavours and acetaldehyde production. Moreover, the mass of cells required for this process may be economically prohibitive. Striking a satisfactory balance between sufficiently and economically attenuating the cell culture whilst retaining adequate enzyme activity has, thus, been described, but is effectively impossible to achieve in practice (Fox et al., supra).

Alternative pre-treatment methods using solvents, such as n-butanol, to accelerate ripening, have also proven commercially impractical (Exterkate F. A., J. Diary Res., 46, 473–484, 1979).

Thus, there is a need for a commercially practical method to attenuate a bacterial culture which both kills sufficient cells to limit the production of lactic acid but which also retains high levels of enzyme activity.

We have now, surprisingly, found that the treatment of bacterial starter cultures with surface active agents attenuates the starter culture in such a manner as to overcome the problems identified above.

Thus, in a first aspect, the present invention provides a method for accelerated cheese ripening using a primary starter culture and an attenuated bacterial starter culture, characterised in that the attenuated starter culture is obtained by treatment with an acceptable surface active agent.

The term 'starter culture' relates to any bacterial culture that is suitable for use in cheese ripening, such as Bifidobacteria, Brevibacteria, Lactobacilli, Lactococci, Leuconostocs, Micrococci and Pediococci. We prefer that the culture is a member of the lactic acid bacteria. We particularly prefer that the bacteria that are used in the starter culture are Lactococcus species. It will be appreciated that the term 'starter culture' may encompass a culture containing a single strain of bacterium, or more than one bacterial strain. The term 'starter culture' may also include genetically modified organisms (GMO's). In any event, the term, 'starter culture' is well known in the art, and the invention extends equally to all known starter cultures.

The ripening of cheese relies on the curds being converted into cheese with the desired flavour, texture and aroma. Without being constrained by theory, it is known that a number of different biochemical reactions are involved in the maturation process. Ripening is related to the production of peptides and amino acids from casein, and also to the breakdown of fatty acids into keto acids, ketones and esters by lipolysis. Nevertheless, the development of cheese flavour evidently involves a complex interaction, most likely comprising mainly the breakdown products of proteolysis and lipolysis, and many starter cultures are known to express enzymes implicated in cheese ripening. It is these cultures which it is preferred to attenuate for use in the present invention.

The attenuated starter cultures are selected for their enzyme activity so that, while they will generally be selected within the criteria laid down above, it is preferred that they do not generate lactic acid as this is the function of the primary starter culture. In fact, the primary starter culture (or primary culture) will not generally start to produce lactic acid until after its addition. Accordingly, as this tends to rely on gene expression, the attenuated culture cannot play a large part in acidogenesis. Instead, the attenuated culture essentially serves as a source of ripening enzymes, but saves on the cost of isolating the individual enzymes and loses no activity through thermolability. It is particularly surprising that surface active agents, such as dodecyl sulphate, have no significant effect on enzyme activity, as they are known to be extremely denaturing (Scopes, R. K., Protein Purification, Principles and Practice, 1982, Springer advanced texts in Chemistry, publ. Springer-Verlag).

As used herein, the term "attenuated" relates to a bacterial culture so treated as to render the majority of the cells therein unviable. In the context of the invention, it is preferred that no cells be detectably viable in the mature cheese and, more preferably, that no cells should be detectably viable in the attenuated starter culture (or attenuated culture).

The cells of the attenuated culture are preferably rendered unviable, or dead, without disruption. An homogenised preparation loses enzymes in the whey, as described above. However, a level of disruption is acceptable, provided that it is not too great.

When using a non-attenuated starter culture, variable growth of the starter culture cells is often observed. This frequently leads to variable enzyme activity levels and a degree of inconsistency in the degree of ripening, which is undesirable in a commercial operation. There is no problem with variable growth rates when treated starter cultures are used, as a defined quantity of the treated cells may be added having a predetermined enzyme activity. This reduces the variation in enzyme levels, and results in a more consistent cheese end product.

As stated above, it is preferred that the number of live cells in the final culture is reduced to such a level that there are no viable cells remaining. Elimination of viable cells is advantageous in ensuring that any given cheese product passes safety tests of some food regulatory bodies, which is particularly important when GMO's are being used in the cheese. Reduction to such low levels also has advantages in industrial practice, as it helps to prevent the isolation and identification of commercially valuable strains from the final cheese product.

The term 'surface active agent', as used herein, refers to any agent which is capable of acting on the membrane of a micro-organism to kill, incapacitate, or otherwise reduce the viability of the cell. The surface active agent is preferably a detergent or surfactant. We prefer that the agent is a detergent, such as an alkyl-carboxylate, a quaternary ammonium compound, a sulphonate, a betaine, a sulpho betaine, an alkyl glucoside, a bile salt, or an alkylethoxylate. More preferred are the specific detergents lauroyl-sarcosine salt, lauryl dimethylamine oxide, dodecyldimethylglycine, octyl-β-d-glucoside, cholic acid salts, deoxycholate salts and polysorbate 20, or mixtures of the above. We particularly prefer that the detergent is an alkylethoxylate, such as Triton® X-100 (t-octylphenoxypolyethoxyethanol), or a member of the sulphonate class, with the most preferred compound being sodium dodecyl sulphate (hereinafter referred to as 'SDS'). Where SDS is referred to herein, it will be understood that reference is also had to any other suitable surface active agent, unless otherwise specified.

It will be appreciated that the surface active agent is also preferably compatible with use in or with foodstuffs, or one that is easily removable from the treated cells before the addition of the starter culture to the cheese. An acceptable surface active agent is one which may be safely consumed in the diet at levels found in the finished cheese. SDS is particularly preferable in this respect. It is already listed in the Food Chemicals Codex, as compatible for use in foodstuffs, is employed within the food industry as a surfactant and emulsifier, and is found as an ingredient in toothpastes. In general, such agents as bile salts are acceptable, although kosher considerations may need to be taken into account. It will be understood that the surface active agent should be present only in safe amounts in the finished cheese.

The surface acting agent may be used at any suitable concentration, such that enzyme activity is retained but cell viability is sufficiently reduced. We prefer that the concentration of surface active agent is sufficient to reduce the cell viability to levels of no more than $5\times10^4$. Colony forming units (CFU) per ml of starter culture concentrate, or less, preferably being so low as to effectively be 0. It will be appreciated that the concentration of surface active agent that is required will be dependent upon a number of factors, such as the nature of the surface active agent, the total number of cells, the cell density, the temperature and the time of contact with the cells.

In the specific case of SDS, we prefer that SDS is present at a final concentration of between 0.01% and 0.5% w/v for cells that are present at a density of $10^{9-10^{11}}$ colony forming units (CFU)/ml, more preferably between 0.02 and 0.06% w/v. In all cases herein, % SDS is given as weight per volume of the sample to be treated. We particularly prefer that SDS is used at a concentration of 0.04% for cells at a density of $5\times10^9$ to $5\times10^{10}$ CFU/ml. We also prefer that cells are treated at a temperature that allows enzyme activity to be retained, which is preferably between 2° C. and 15° C., more preferably less than 5° C. Under these circumstances we prefer that the cell culture is treated for at least one hour, although it will be appreciated that treatment for longer periods is also effective. However, it will be appreciated that incubation with surface active agent may be carried out at room temperature under certain circumstances, such as with rapid freezing techniques (see Example 6). In the case of Triton® X-100, we prefer that the detergent is used at a concentration of 1–5 % w/w, preferably 1.5–3 w/w % for cells at a final concentration of $10^{11}$ CFU/ml.

The surface active agent may be added to the starter culture cells at any suitable point prior to the addition of the starter culture to the cheese. We prefer that the surface active agent is added to the cells after fermentation is complete, with the cells at stationary phase. This allows an optimum interaction of the surface active agent with the cell membranes of the bacterial cells. However, it will be appreciated that the surface active agent may be added to the culture at any suitable point before stationary phase is reached, or at a later stage, such as after the cells have been concentrated to form a cell cream.

Without being constrained by theory, it is thought that disruption of the cell membrane by the surface active agent is responsible for the reduction in cell viability. Therefore, the accessibility of the surface active agent to the membrane is likely to be the critical constraint in the efficiency of the attenuation process. For treatment of a cell cream, which contains cells at a higher density than a stationary phase culture, the concentration of surface active agent may have to be higher and will be related to cell concentration.

We prefer that the disruption of the cell membrane by a surface active agent allows the intracellular enzyme access to the substrates for the reaction, and allows release of the products of the reaction. We also prefer that the cell is not permeabilised to the extent that intracellular enzymes are released from within the cellular structure. In this way the intracellular enzyme is retained in the cheese curd during the treatment, with access to the relevant substrates, and is not lost in the whey.

Following treatment with the surface active agent, we prefer that the cells are centrifuged to form a cell cream. The attenuated culture may then be added directly to the milk. However, we prefer that the cell cream is further treated to reduce the number of viable cells, such as, for example by freezing, or drying. We particularly prefer that the cell cream is treated by freeze-thawing and then drying. Such treatment is also suitable for the preparation of the attenuate culture in a form that is appropriate for storage.

It will be appreciated that the present invention requires that the treatment of the starter culture cells with the surface active agent does not significantly decrease the activity of the bacterial enzymes involved in cheese ripening. We prefer that the enzyme activity of the attenuated culture is at least 85% of the value of untreated cells, with at least 90% activity being particularly preferred. With respect, specifically, to cellular proteolytic enzymes, we prefer that at least 85% of the activity of these enzymes is maintained.

In general, methods well known in the art may generally be employed, together with the method of the invention, to make cheese.

The present invention will now be illustrated by way of the following Examples, which are illustrative of the present invention, but not limiting upon it.

EXAMPLE 1

Effect of SDS and Temperature on the Viability and Enzyme Activity of Bacterial Cells Method: *Lactococcus lactis* strain NCDO 712 cells were grown in M17 medium (Terzaghi B. E. and Sandine W. E., 1975, Applied Microbiology 29, 807–813) containing 6% w/v lactose, and being modified by using sodium phosphate buffer (100 mM) in place of sodium glycerophosphate. The cells were grown at 30° C. at pH 6–7, until the stationary phase was reached. 100 ml samples of resulting culture were treated with SDS over a range of SDS concentrations. Assays were carried out on samples treated with SDS at both room temperature and 4° C. Incubation with SDS was carried out for one hour. After incubation, the treated cultures were assayed both to determine the number of viable cells remaining, and for aminopeptidase enzyme activity.

Cell viability was assessed by serial dilution of the treated culture cells onto MRS agar (Oxoid Ltd).

Aminopeptidase activity was assessed by the use of a spectroscopic assay. Aminopeptidase is an intracellular enzyme, which normally requires that cells are disrupted by sonication before the assay is carried out. However, as a result of the treatment with SDS, there was no need to further disrupt the cells before the assay, as substrate was able to enter the treated cells.

One unit of aminopeptidase activity is defined as the amount of enzyme required to liberate p-nitroaniline at a rate of 1 μmole per minute from a 0.7 mM solution of L-leucine p-nitroanilide (Sigma) at pH 7 and 30° C., the reaction being carried out in 100 mM phosphate buffer. The rate of liberation of p-nitroaniline may be determined from the rate of increase in absorbance of the solution at 410 nm, and the extinction coefficient of p-nitroaniline (Aldrich Chemical Co.) dissolved in the same buffer under the same conditions.

Results

| Sample | % AP recovery | CFU/ml |
|---|---|---|
| control | 100 | $1.89 \times 10^{10}$ |
| 0.01% w/v SDS, RT | 105.4 | $3.82 \times 10^{9}$ |
| 0.04% w/v SDS, RT | 60.4 | $8.55 \times 10^{4}$ |
| 0.08% w/v SDS, RT | 32.2 | $<10^{3}$ |
| 0.01% w/v SDS, 4° C. | 98.2 | $1.96 \times 10^{9}$ |
| 0.04% w/v SDS, 4° C. | 105.4 | $2.45 \times 10^{4}$ |
| 0.08% w/v SDS, 4° C. | 76.6 | $<10^{3}$ |

From the results, it can be seen that cells treated with 0.04% and 0.08% SDS at room temperature lose a large proportion of aminopeptidase activity. However, cells treated at 4° C. at a final concentration of 0.01% and 0.04% SDS retain greater than 85% enzyme activity.

It is apparent that only treatments at SDS levels greater than 0.4% reduce cell viability to a preferred level of $5 \times 10^{4}$ CFU/ml, or less.

A combination of the cellular viability data and aminopeptidase activity data suggests that optimum conditions for attenuation of a *Lactococcus lactis* culture occur when a culture of cells at stationary phase are treated for one hour with SDS at a final concentration of 0.4% and at 4° C.

EXAMPLE 2

*Lactococcus lactis* strain NCDO 712 was grown as in Example 1 SDS (0.04%) was added to 1200 l of fermentation broth containing approximately $10^{10}$ cells/ml. The cell broth was treated with SDS for one hour, and then concentrated using a continuous centrifuge. Viability and enzyme activity were determined in samples of the cell broth at different stages of treatment.

Results

| Sample description | Enzyme activity | Viable cell count CFU/ml |
|---|---|---|
| Whole broth prior to SDS addition | 100 | $1.04 \times 10^{10}$ |
| Whole broth after SDS treatment | 103 | $1.75 \times 10^{3}$ |
| Cell cream at end of centrifugation | 130 | $<1 \times 10^{3}$ |

The results indicate that SDS treatment is effective in sled up treatments, reducing cell viability to the desired level. Enzyme activity is maintained. In addition, the effect of centrifugation on reducing cell viability is demonstrated.

EXAMPLE 3

The Effect or SDS on Viability of Mixed Strain Starter

The effect of SDS was assessed on a commercially available mixed starter strain, strain R604 (Chr. Hansen). Frozen pellets of strain R604 were diluted with cell free fermenter broth to achieve a density of $1.4 \times 10^{10}$ CFU/ml This was carried out to mimic a culture broth at the end of fermentation.

The resultant mixed strain culture broth was divided into two aliquots and equilibrated to 8–10° C. Once at this temperature, one sample was treated with SDS to give a final concentration of 0.04% w/v. The untreated sample was used as a control. Both samples were held at 8–10° C. for the duration of the experiment. Viable cell counts were carried out at 1 hour and 24 hours.

Results

| Sample | CFU/ml (1 hour) | CFU/ml (24 hours) |
|---|---|---|
| control | $1.38 \times 10^{10}$ | $7.00 \times 10^{9}$ |
| 0.04% SDS | $<10^{4}$ | $<10^{2}$ |

The results indicate that SDS is as effective against a commercially available starter strain, in terms of reduction in viable cells, as it is against *L. lactis* strain NCDO 712.

EXAMPLE 4

Accelerated Cheese Ripening Using SDS Treated Cells

Cheddar cheese was produced in 10 liter cheese vats using a standard procedure, using Ch. Hansen strain R604 as a starter and Maxiren (Gist-brocades) as a coagulant. The first vat was prepared with the addition of 2.5 g of freeze dried, SDS treated cells. The second vat was prepared in the same manner, except that no SDS cells were added. This vat was the control experiment.

The resultant pressed cheeses were split into 200 g aliquots and curd slurries were prepared. These were incubated at 30° C. for 6 days and then assayed for protein breakdown using the SSA method and assessed by a trained panel of sensory experts for flavour attributes. There were no significant differences observed in the cheese makes with and without SDS treated cells. The sensory and SSA results are summarised below.

| Curd/treatment | Sensory Evaluation | Acid Soluble Amino Acid |
|---|---|---|
| Control | Bland, creamy, bitter | 2 |
| SDS | creamy, milky, cheesy, 'cheddary', not bitter | 5 |

The results indicate that SDS-treated cells have no adverse effects on cheese production, and addition of SDS-treated cells stimulated protein breakdown and accelerated cheese ripening. In addition, the SDS-treated cells prevented bitter off-flavours in the cheese due to the breakdown of bitter peptides by aminopeptidases in the SDS-treated cells.

EXAMPLE 5

Effect of Triton X-100® on Viability and Enzyme Activity of Bacterial Cells

*Lactococcus lactis* strain NCDO 712 was grown as in Example 1. The fermentation broth was concentrated by centrifiguration and stored frozen for the purposes of the experiment.

On thawing, the concentrate was maintained between 0° C. and 5° C. and treated with 1 mg of bovine deoxyribonuclease (Sigma) per Kg of concentrate to reduce viscosity (an increase in viscosity was caused by the release of DNA from a very small proportion of the cells that lysed, as a result of the freeze/thaw cycle.)

The reduced-viscosity concentrate was divided into aliquots for various treatments as indicated in the table. Triton X-100® was added, mixed thoroughly and stored at 4° C. for 1 hour, then frozen overnight.

The aliquots were thawed and the aminopepidase activity determined by the method given in Example 1.

| Triton X-100 ® Addition % w/w | % AP Recovery | CFU/ml |
|---|---|---|
| 0 | 100 | $1 \times 10^{9}$ |
| 0.1 | 115 | $5 \times 10^{7}$ |
| 1.0 | 127 | $<10^{3}$ |

Cell viability was assessed by serial dilution of the treated culture cells onto sugar-free count agar (Merck 10878), counting all pinpoint colonies.

The results indicate that Triton X-100 at doses of 1% w/w still gives viable AP enzyme activity, with an appropriate reduction in cell viability.

EXAMPLE 6

Pre-Treatment of Concentrated Cultures with SDS Prior to Rapid Freezing

Lactococcus strain NCDO 712 cells were grown as in Example 1. The fermentation broth was concentrated by centrifugation divided into aliquots and immediately treated at room temperature with SDS at the levels indicated in the table below.

After mixing and holding for one hour the concentrate was dripped into liquid nitrogen (−195° C.) to form pellets between 3 mm and 10 mm in size, and stored overnight at −70° C. A sample was removed from each aliquot for testing directly after thawing and the remainder dried without thawing by lyophilisation.

The tests included cell viability, by serial dilution onto M17 agar (Oxoid Ltd), AP recovery by the method described in Example 1, dipeptidylhydrolase (DPI) activity and estimates of the activity of these enzymes that is disassociated from the cells.

DPH activity was measured by the same method as AP activity except that 1.5 mm L-glycylproline p-nitroanilide (Sigma) was substituted for 0.7 mM L-leucine p-nitroanilide.

The disassociated enzyme activity was determined by preparing a suspension of the test sample in assay buffer, sedimenting the cells in a laboratory centrifuge and determining the percentage of the total activity in the supernatant fraction. The results are summarised in the table below.

The results illustrate the principle that rapid freezing permits a higher incubation temperature to be used and avoids the need for refrigeration during the incubation. In addition, the detergent (SDS) is added after the cells have been concentrated, rather than before, which demonstrates the flexibility of the method.

It will be appreciated that in different methods, optimum conditions must be worked out on a case by case basis in order to reduce the viable cells count to the preferred level, whilst retaining suitable enzyme activity.

The tests also showed that after treatment the enzymes were substantially retained by the cells, which is preferred, the aminopeptidase more so than the dipeptidylhydrolase.

| | AP Recovery (%) | | | | DPH Recovery (%) | | | | Free AP (%) | | | |
|---|---|---|---|---|---|---|---|---|---|---|---|---|
| | Before lyophillisation | | After lyophillisation | | Before lyphillisation | | After lyphillisation | | Before lyphillisation | | After lyphillisation | |
| SDS Addition % w/w | Replicate A | Replicate B | Replicate A | Replicate B | Replicate A | Replicate B | Replicate A | Replicate B | Replicate A | Replicate B | Replicate A | Replicate B |
| 0 | 100.0% | | 100.0% | | | | 100.0% | 100.0% | 6% | | 11% | 4% |
| 0.1 | 100.7% | | 148.2% | 103.0% | | | 122.0% | 108.1% | 10% | | 8% | 3% |
| 0.3 | | | | 131.2% | | | | 133.2% | | | | 3% |
| 0.5 | 150.4% | | 198.6% | 130.2% | | | 141.8% | 136.7% | 8% | | 7% | 3% |

| | Free DPH (%) | | | | CFU/g dry matter | | | |
|---|---|---|---|---|---|---|---|---|
| | Before lyophillisation | | After lyophillisation | | Before lyphillisation | | After lyphillisation | |
| SIDS Addition % w/w | Replicate A | Replicate B | Replicate A | Replicate B | Replicate A | Replicate B | Replicate A | Replicate B |
| 0 | | | 17% | | | | 1.00E+09 | 1.00E+09 |
| 0.1 | | | 14% | | | | 2.00E+07 | 5.00E+08 |
| 0.3 | | | | | | | | <10$^3$ |
| 0.5 | | | 17% | | | | <10$^3$ | <10$^3$ |

We claim:

1. A method for accelerating cheese ripening, comprising:
   attenuating a first starter culture with a surface active agent to obtain an attenuated starter culture; and,
   using said attenuated starter culture and a primary starter culture to accelerate cheese ripening.

2. A method according to claim 1, wherein the attenuated starter culture bacteria are lactic acid bacteria.

3. A method according to claim 1, wherein the surface active agent is a detergent or surfactant.

4. A method according to claim 3, wherein the surface active agent is an alkylcarboxylate, a quaternary ammonium compound, a sulphonate, a betaine, a sulpho betaine, an alkyl glucoside, a bile salt, or an alkylethoxylate.

5. A method according to claim 4, wherein the surface active agent is lauroyl sarcosine salt, lauryl dimethylamine oxide, dodecyldimethylglycine, octyl-β-d-glucoside, cholic acid salts, deoxycholate salts, polysorbate 20, or a mixture of any of the foregoing.

6. A method according to claim 1, wherein the surface active agent is sodium dodecyl sulphate.

7. A method according to claim 6, wherein the sodium dodecyl sulphate is present at a final concentration of between 0.01% and 0.5% w/v of the sample to be treated for cells that are present at a density of $10^9$–$10^{11}$ colony forming units (CFU)/ml.

8. A method according to claim 1, wherein the surface active agent is t-octylphenoxypolyethoxyethanol.

9. A method according to claim 8, wherein t-octylphenoxypolyethoxyethanol is used at a concentration of 1–5% w/w for cells at a final concentration of $10^{11}$ CFU/ml.

10. A method according to claim 1, wherein the viability of the attenuated starter culture is reduced to no more than $5\times10^4$ Colony Forming Units (CFU) per ml of starter culture concentrate.

11. A method according to claim 1, wherein enzyme activity of the attenuated culture is at a level of at least 85% of that of the culture before treatment with the surface active agent.

12. A method according to claim 11, wherein at least 85% of the activity of cellular proteolytic enzymes is maintained.

13. A method according to claim 1, wherein the cells treated with the surface active agent are further treated to reduce the number of viable cells.

14. A method according to claim 11, wherein the level is at least 90%.

15. A method for accelerating cheese ripening, comprising:
   adding an attenuated starter culture and a primary starter culture to a maturing cheese, wherein said attenuated starter culture is produced by attenuating a first starter culture with a surface active agent to attenuate said first starter culture and obtain said attenuated starter culture.

16. A method according to claim 15, wherein said attenuated starter culture has a cell viability level of no more than about $5\times10^4$ colony forming units per ml of the first starter culture.

17. A method according to claim 15, wherein the attenuated starter culture has an enzyme activity, the first starter culture has an enzyme activity, and the attenuated starter culture enzyme activity is at least 85% of the starter culture enzyme activity.

18. A method according to claim 15, wherein the surface active agent is added to the first starter culture in an amount of about 0.04% w/v and at about 4 degrees C.

* * * * *